United States Patent [19]

Kuramoto

[11] 4,265,341

[45] May 5, 1981

[54] EASY-TO-ASSEMBLE SLIDING ARRANGEMENT IN DISC BRAKE

[75] Inventor: Minoru Kuramoto, Yokosuka, Japan

[73] Assignee: Nissan Motor Company, Limited, Yokohama, Japan

[21] Appl. No.: 50,161

[22] Filed: Jun. 20, 1979

[30] Foreign Application Priority Data

Jun. 26, 1978 [JP] Japan .................................. 53-77199

[51] Int. Cl.[3] .............................................. F16D 65/02

[52] U.S. Cl. .................................................. 188/73.3

[58] Field of Search .................... 188/72.4, 72.5, 73.3, 188/73.5, 206 R

[56] References Cited

U.S. PATENT DOCUMENTS 4,051,926 10/1977 Karasudani ........................ 188/73.3

4,061,209 12/1977 Gee et al. ........................... 188/73.3

4,162,721 7/1979 Moriya ............................... 188/73.3

*Primary Examiner*—Duane A. Reger

*Attorney, Agent, or Firm*—Schwartz, Jeffery, Schwaab, Mack, Blumenthal & Koch

[57] ABSTRACT

A sliding arrangement for slidably mounting a caliper to a carrier is provided, in which each of slide pins slidably received by a bore in the carrier is securely fixed to a support portion of the caliper with a nut engaging a threaded portion of the slide pin. For ease of alignment of the nut with the bore when inserting the pin through the support portion, nut and bore, a member, fixed to the carrier, has a projection, in the form of a sleeve, adapted to align the nut with the bore upon inserting the pin through the support portion of the caliper, nut and bore.

2 Claims, 7 Drawing Figures

FIG. 1 PRIOR ART
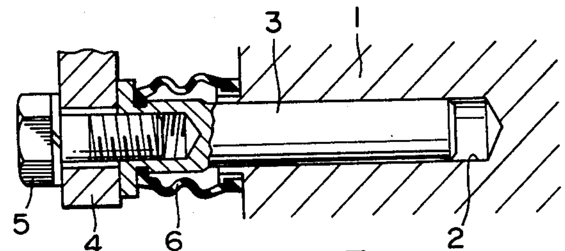
FIG. 5
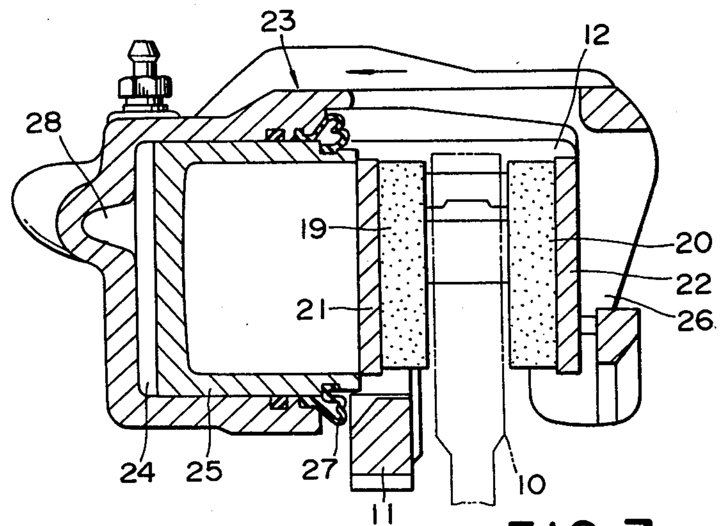
FIG. 7
FIG. 6
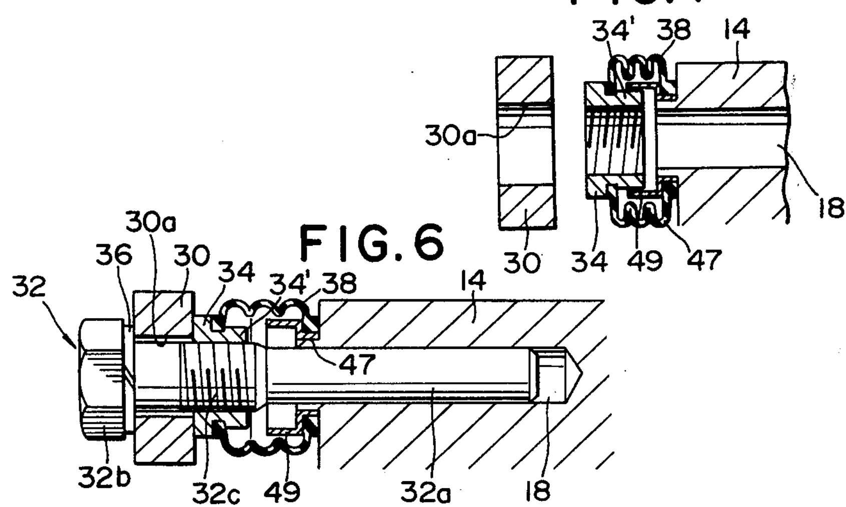

10
37
13
46
33'
31c
29
35
31b
31
31a
17
40
15
11
29a
33
48
39
27
25
19
26
24
28
20
22
21
IV
III
V
V
23
36
32
16
32b
18
14
38
34
30
VI
VI

EASY-TO-ASSEMBLE SLIDING ARRANGEMENT IN DISC BRAKE

BACKGROUND OF THE INVENTION

The present invention relates to disc brakes, and more particularly to a sliding arrangement for slidably mounting a caliper to a carrier in a disc brake.

Disc brakes are known in which when it is required to reduce the rotation of a rotatable disc a cylinder formed in a caliper is pressurized to cause a piston to project, urging an inboard pad into frictional contact with an inboard surface of the disc, and then the caliper moves, relative to a carrier, due to the reaction force resulting from the frictional contact of the inboard pad with the disc, urging an outboard pad into frictional contact with an outboard surface of the disc.

These brakes, therefore, employ a sliding arrangement for slidably mounting the caliper on the carrier.

According to a known sliding arrangement, as illustrated in FIG. 1, a carrier (1) is formed with two parallel bores (2) for slidably receiving slide pins (3) extending from a caliper (4), in which each pin is securely fixed to a supporting portion of the caliper with a mating bolt (5) engaging in a threaded blind bore (6) formed in the pin.

A disadvantage with this known sliding arrangement resides in that if both bolts should disengage from the mating slide pins, due to the vehicle vibrations, the caliper would disengage rendering the disc brake inoperative.

Another disadvantage resides in that, even if desired, the inner diameter of the threaded bore of the slide pin may not be designed large enough to permit the use of a bolt with a threaded portion of sufficient diameter because there is a limitation to increasing the outer diameter of the pin.

SUMMARY OF THE INVENTION

An object of the present invention is to provide a sliding arrangement for a caliper in a disc brake which provides a safeguard against accidental disengagement of a caliper from a carrier and which is easy to assemble.

BRIEF DESCRIPTION OF THE DRAWINGS

In the accompanying drawings:

FIG. 1 is a section similar to FIG. 6 showing the prior art mentioned before;

FIG. 5 is a section taken through the line V—V in FIG. 2;

FIG. 6 is a section taken through the line VI—VI in FIG. 2; and

FIG. 7 is a similar view to FIG. 6 showing the condition wherein the slide pin is disassembled.

DESCRIPTION OF THE PREFERRED EMBODIMENT

Figure 2:
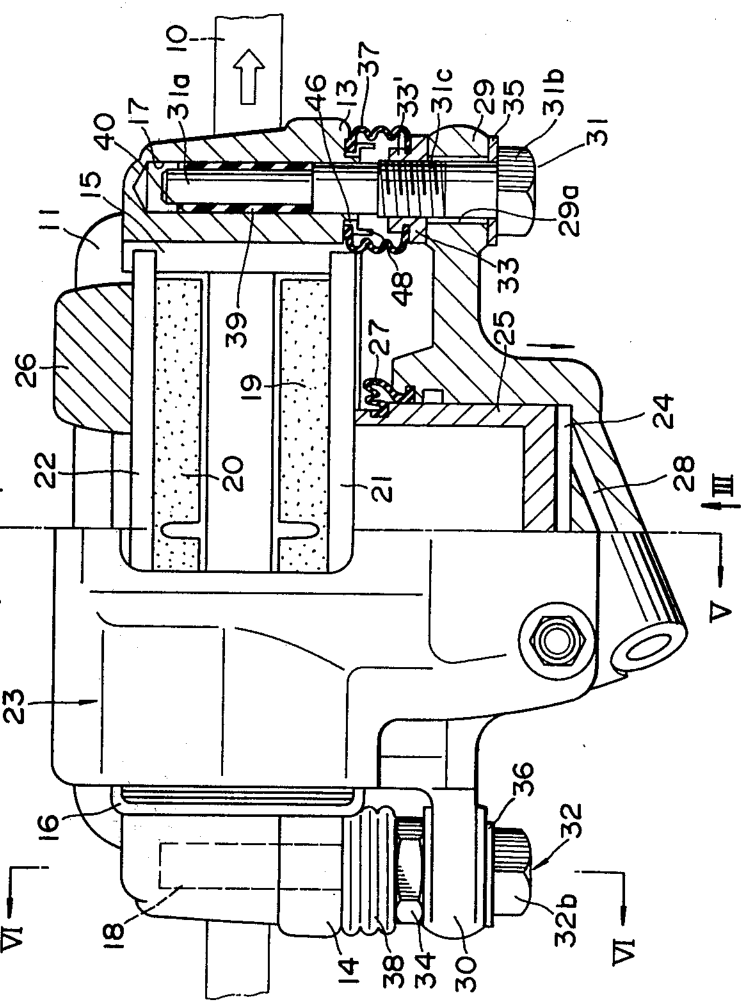
FIG. 2 is a partially cut-away plan view of a disc brake employing a sliding arrangement according to the present invention.
Figure 3:
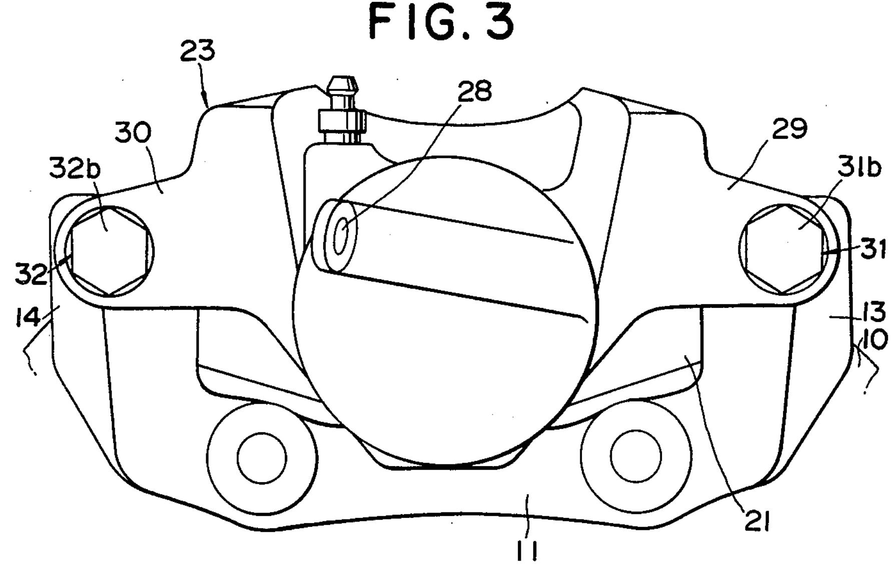
FIG. 3 is a partially cut-away plan, view of the disc brake taken in the direction of arrow III in FIG. 2.

Referring to FIGS. 2 through 6, the reference numeral 10 designates a disc rotatable with a wheel, not shown, and the reference numeral 11 designates a carrier securely fixed to a vehicle body, not shown. The carrier 11 is formed with a groove 12 for allowing the passage of the disc 10.

The carrier 11 is formed with torque receiving portions 13 and 14 for receiving torque transmitted thereto during braking action to reduce the rotation of the disc 10. The torque receiving portions 13 and 14 are formed with shoulders 15 and 16, respectively, on the opposite inside surfaces thereof, respectively, for the purpose of supporting pads. Formed respectively through the torque receiving portions 13 and 14 are guide bores 17 and 18 extending in parallel to each other in a direction substantially perpendicular to side surfaces of the disc 10. The guide bores 17 and 18 are open toward the same direction.

Figure 4:
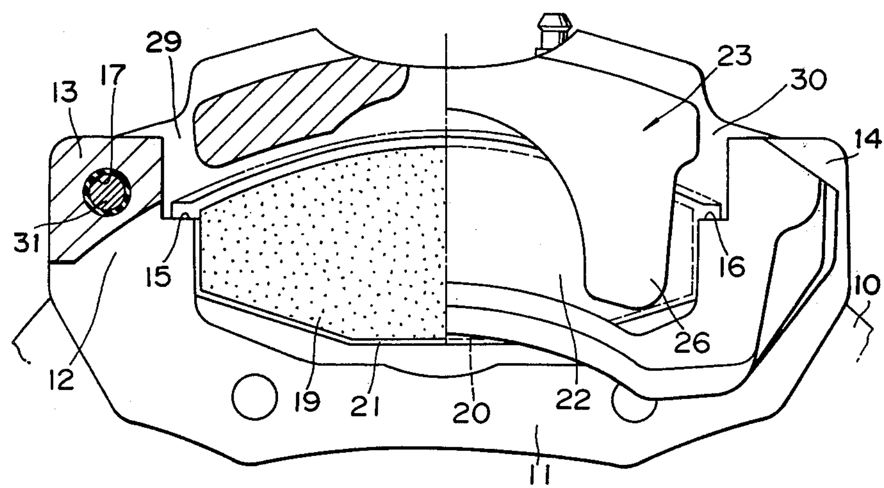
FIG. 4 is a partially cut-away plan, view of the disc brake taken in the direction of arrow IV in FIG. 2.

Two pads, an inboard pad 19 and an outboard pad 20, are arranged on the opposite side surfaces of the disc 10. The pads 19 and 20 are fixedly carried by back plates 21 and 22, respectively, each of which is formed with end portions slidably engaging with shoulders 15 and 16, as shown in FIG. 4, so that the back plates 21 and 22 can slide along the shoulders 15 and 16.

A caliper 23 arranged to straddle the disc 10 and the pad assembly includes a hydraulic cylinder 24 slidably receiving a piston 25 in abutting engagement, at one axial end surface thereof, with the back surface of the back plate 21 carrying the inboard pad 19. The caliper 23 has reaction transmitting portions 26 in abutting engagement with the back surface of the back plate 22 carrying the outboard pad 20, as shown in FIGS. 2 and 5.

As shown in FIGS. 2 and 5, a boot 27 is provided to seal a space between the sliding surfaces of the piston 25 and cylinder 24 wall so as to prevent entry of dust.

The cylinder 24 is pressurized or drained through a hydraulic fluid passage 28.

The caliper 23 is formed with caliper support protruding portions 29 and 30 to which slide pins 31 and 32 are securely fastened, respectively, and from which the slide pins 31 and 32 extend into the bores 17 and 18 for slidable engagement therewith, so that the caliper 23 is slidable, in the perpendicular direction to the disc 10, with respect to the carrier 11.

As best shown in FIGS. 2 and 6, the slide pins 31 and 32 include slide portions **31*a* and 32*a*, respectively, slidably received by the bores 17 and 18, respectively; head portions 31*b* and 32*b* or enlarged diameter end portions, respectively; and threaded portions 31*c* and 32*c***, respectively, each formed with a thread on a periphery thereof. The threaded portion of each pin is disposed between the slide portion and head portion thereof.

Preferably, the threaded portion is larger in diameter than the slide portion.

The slide pins 31 and 32 extend through holes **29*a* (see FIG. 2) and 30*a* (see FIG. 6), respectively, formed in the support portions 29 and 30, respectively, and the size of each of the holes 29*a* and 30*a* is large enough to make alignment of each pin to the corresponding bore 17 or 18** easy during assembly.

Each of the slide pins 31 and 32 is securely fixed to the support portion 29 or 30 of the caliper 23 with a mating nut 33 or 34 threadedly engaging with the threaded portion **31*c* or 32*c*** of the slide pin to interpose the support portion between the head portion and the nut.

The reference numerals 35 and 36 designate washers, each interposed between the head portion of each slide pin and the support portion of the caliper 23.

The reference numerals 37 and 38 designate rubber protective boots, each extending between the nut mating with one of the slide pin and the torque receiving portion 13 or 14 of the carrier 11. Each protective boot 37 or 38 has one end fixed to the carrier 11 at the torque receiving portion 13 and 14 and an opposite end fixed to the nut, partially covering the pin.

The reference numeral 39 is a rubber bushing surrounding the reduced diameter slide portion 31*a* of the slide pin 31 for the purpose of compensating for the deformation of the leading torque receiving portion 13 of the carrier 11, with respect to rotation (indicated by an arrow R), during braking. The bushing 39 is held in the bore 17 by a suitable means, at 40.

For retaining that end of the boot 37 or 38 adjacent the torque receiving portion 13 or 14 of the carrier 11, a retainer seat 46 or 47 is fixed to the torque receiving portion 13 or 14 around the end of the bore 17 or 18. The seat 46 or 47 has a projection in the form of a guide sleeve 48 or 49 disposed in the boot 37 or 38 to be surrounded thereby. The guide sleeve 48 or 49 extends toward the nut 33 or 34 so that when the pin 31 or 32 is disassembled, the boot 37 or 38 urges the nut 34, toward the position as illustrated in FIG. 7 in which the guide sleeve 48 or 49 receives a reduced diameter end portion 33' or 34' of the nut 33 or 34 so as to align the threaded bore of the nut with the bore 17 or 18 of the torque receiving portion 13 or 14.

Although in this illustrated embodiment, the guide sleeve is out of engagement when the pin is assembled and is in engagement with the nut when the pin is disassembled, the guide sleeve may be elongated so that the nut is always in slidable engagement with the guide sleeve.

When it is desired to reduce the rotation of the disc, pressurized hydraulic fluid is supplied to the port 28 (see FIGS. 3 and 5), pressurizing the cylinder 24 to cause the piston 25 to project, thus urging the inboard pad 19 into frictional contact with the inboard surface of the disc 10. Then, the caliper 23 moves, due to the reaction force resulting from the frictional contact of the inboard pad with the disc 10, in the direction opposite to the projecting movement of the piston 25, thus causing the reaction transmitting portions 26 to urge the outboard pad 20 into frictional contact with the outboard surface of the disc 10. This movement of the caliper 23 relative to the carrier 11 is allowed because the slide pins 31 and 32 of the caliper slide in the bores 17 and 18, respectively, of the carrier. The rotation of the disc 10 is reduced due to frictional contact of the pads 19 and 20 with the opposite surfaces of the disc 10.

During braking to reduce the rotation of disc 10 by the pads 19 and 20, the torque of the disc 10 is transmitted, through the pads 19 and 20, to the torque receiving portion 13 of the carrier 11, tending to deform the latter. The deformation of the torque receiving portion 13, where the bore 17 receiving the pin 31 is formed, can be compensated for by the deflection of the bushing 39, so that controlled sliding movement of the pin 31 is assured.

The movement of the support portion 29 or 30 as the caliper 23 moves is limited by the head portion 31*b* or 32*b* of a single piece including the slide portion 31*a* or 32*a* slidably supported by the carrier 11, even if the nut 33 or 34 is disengaged from the threaded portion 31*c* of the piece cuasing loose slidable engagement with the pin 31 or 32, thus providing a safeguard against accidental disengagement of the caliper 23 from the carrier 11.

This may be assured from the fact that suitable resistance is provided by the sliding movement of the slide portion 31*a* or 32*a* in the bore 17 or 18 for the purpose of controlled movement of the caliper 23 relative to the carrier 11, so that it is unlikely that pin 31 or 32 will become disengaged from the carrier 11 during operation of the disc brake.

The threaded portion 31*c* or 32*c* is an enlarged, in diameter, portion externally threaded to engage with the internally threaded nut 33 or 34, and the diameter of the threaded portion 31*c* is designed, large enough to assure sufficient engagement between the threaded portion 31*c* or 32*c* and the nut 33 or 34.

It will, therefore, be understood that the problem of the nut becoming loose during operation of the disc brake is solved.

The boot 37 or 38 is not only fixed at one end to the carrier 11 but also fixed at the opposite end to the nut 33 or 34 in order to prevent rotation thereof, thus contributing to the prevention of the nut from loosening.

The nut 33 or 34 is formed with a groove on its outer periphery for tight engagement with the boot 37 or 38.

It will now be appreciated that with the sliding arrangement according to the present invention the safeguard against the accidental disengagement of the caliper from the carrier in the disc brake is provided.

Furthermore will now be appreciated that the sliding arrangement according to the present invention is easy to assemble because of the automatic alignment mechanism of the nut with the bore of the torque receiving portion of the carrier.

It will also be appreciated that with this automatic alignment mechanism the sliding arrangement is now suitable for automatic assembly.

What is claimed is:

1. A sliding arrangement in a disc brake comprising:

a carrier formed with a bore;

a caliper having a pin including a slide portion slidably received in the bore;

said pin extending through a support portion of said caliper and having a portion formed with a thread on a periphery thereof and a head portion, said threaded portion being disposed between said slide portion and said head portion;

a nut engaging said threaded portion of said pin to interpose said support portion of said caliper between said head portion of said pin and said nut;

a protective boot having one end fixed to said carrier around the opening of said bore and an opposite end fixed to said nut mating with said pin to partially cover said pin;

a member fixed to said carrier, said member including a projection which has a cylindrical wall in register with the bore of said carrier and which is disposed in said protective boot and surrounded thereby; and a cylindrical portion formed on said nut, having substantially the same diameter as the cylindrical wall of said projection of said member so as to be fittingly receivable thereby such that during assembly, said projection of said member and said portion of said nut cooperate to align said nut with said bore of said carrier to make it easy to insert said pin through said nut into said bore.

2. A sliding arrangement as claimed in claim 1, in which said projection is a sleeve extending to slidably receive said portion of said nut.

* * * * *